2,956,774

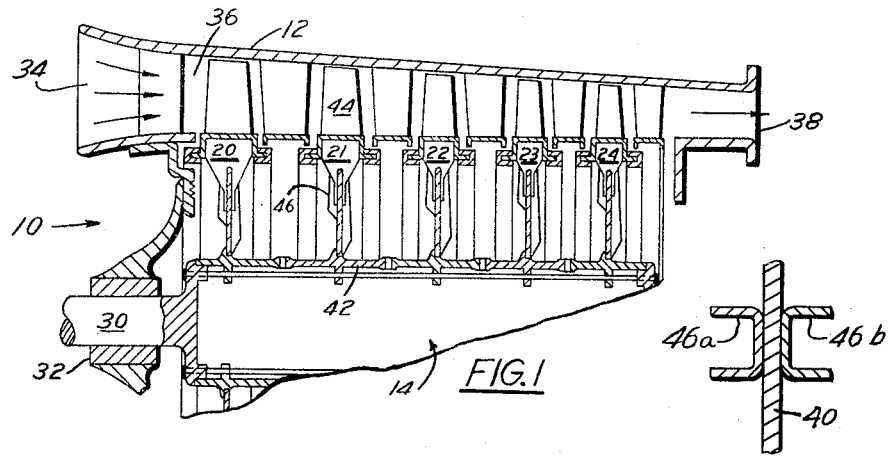
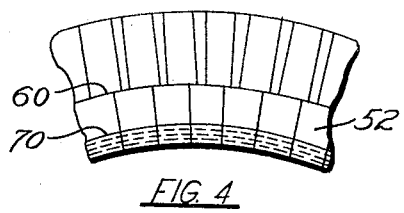
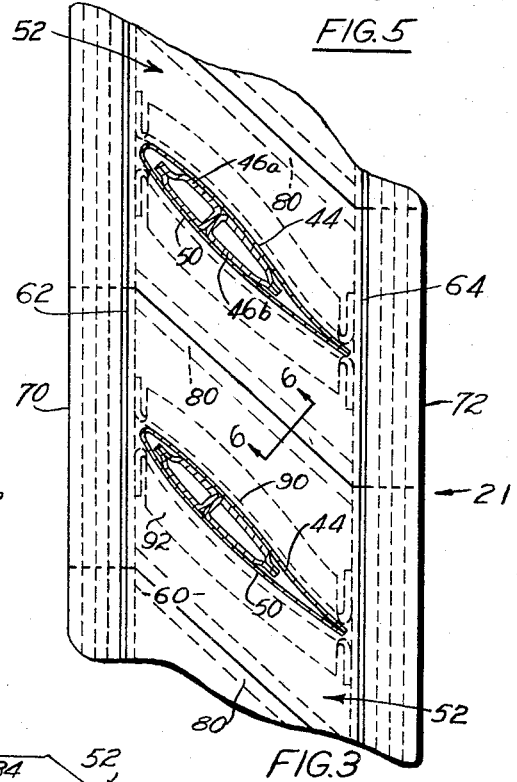
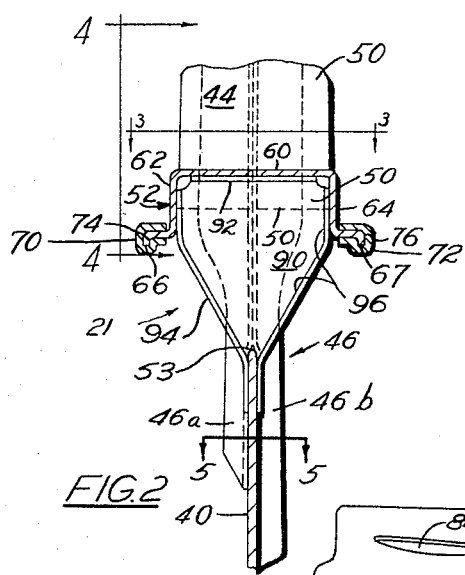
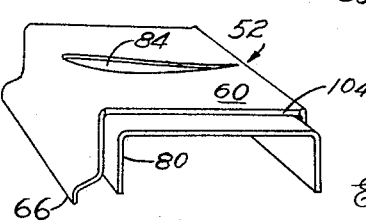
INVENTOR.
Edward A. Stalker United States Patent Office 2,956,774
Patented Oct. 18, 1960

VIBRATION DAMPERS FOR BLADED WHEELS

Edward A. Stalker, Bay City, Mich., assignor to The Stalker Corporation, a corporation of Michigan Filed Sept. 28, 1954, Ser. No. 458,911

8 Claims. (Cl. 253—77)

This invention relates to bladed wheels for compressors, turbines and the like.

An object of the invention is to provide a damping means for damping the vibration of the blades by operating on the rim of the hub structure.

Another object is to provide a damping means particularly suitable for sheet metal construction of the rotor.

Other objects will appear from the description, drawings and claims.

The above objects are accomplished by the means illustrated in the accompanying drawings in which Fig. 1 is a fragmentary axial section through a compressor whose wheels incorporate damping means according to this invention;

Fig. 2 is a fragmentary axial section through a wheel showing the rim and the portions adjacent thereto;

Fig. 3 is a fragmentary development of the blading of a wheel of Fig. 1 shown partly in section taken on line 3—3 in Fig. 2;

Fig. 4 is a fragmentary view of the rim and blades of a wheel as seen from 4—4 in Fig. 2;

Fig. 5 is a fragmentary section on line 5—5 in Fig. 2;

Fig. 6 is a fragmentary section on line 6—6 in Fig. 3; and

Fig. 7 is a perspective view of a rim segment.

In this invention the blades are supported so that if they vibrate the center or pivot line about which the principal vibration takes place is spaced inward from the perimeter of the wheel hub structure. The rim means is comprised of a plurality of rim segments each fixed to a blade for vibration with it. The front and rear edges of the rim segments fit into recesses of a damping ring. When the wheel is rotated centrifugal forces cause the segments and ring to press one against the other creating magnified friction forces which damp vibrations of the segments and blades.

Referring to the drawings, particularly to Fig. 1, the present invention is shown for purposes of illustration as being incorporated in a compressor indicated generally at 10. It comprises the case 12 and the rotor 14 made up of the bladed wheels 20–24. The rotor is supported on the shaft means 30 in the bearing 32 and similar bearings at the rear end, not shown. Fliud enters the inlet 34 and flows through the annular passage 36 to the exit 38.

The bladed wheels are similar to wheel 21 which will now be described in detail. It is comprised of a hub structure including a rim means and preferably a wheel disk 40 fixed to a hub ring 42 as illustrated in Figs. 1, 2 and 5. A plurality of blades 44 are equally spaced about the periphery of disk 40 extending radially thereof, and each of the blades is fixed to the disk by blade stems shown generally at 46 and including the parts 46a and 46b, as seen in Fig. 2 and Fig. 5. These stem parts include an upper portion contoured to fit within the blade envelope 50, as seen in Fig. 3, and are fixed to the internal surfaces of the blade envelope by a suitable attachment, for example with fused metal. The stem parts 46a and 46b project from the lower end of the blade envelope 50 and are contoured, as indicated by the curved dotted lines in Fig. 2, to provide generally U-shaped portions in cross section, as seen in Fig. 5, spaced apart to be received along opposite sides of disk 40. These lower portions of parts 46a and 46b are preferably soldered to the disk. Each blade carries a rim segment 52 thereon, fixed to the blade envelope adjacent the end thereof nearest to disk 40, with a portion of envelope 50 extending within the associated rim segment, as shown in Fig. 2.

The blade will tend to vibrate about a portion thereof adjacent to the locality of blade support near the perimeter 53 of the wheel disk 40, and thus create forces having substantial components in a direction parallel to the periphery of the rim means and the wheel.

Each segment as shown particularly in Figs. 2, 3 and 4 has the rim surface 60, the front and rear sides 62 and 64, and the front and rear flanges 66 and 67 which extend outwardly on opposite sides of the segment in a generally axial direction. Front and rear damper rings 70 and 72 extend around the wheel in alignment axially thereof with the front and rear flanges 66 and 67, which flanges are in turn aligned with the flanges on adjacent said rim segments peripherally around the wheel. The damper rings 70 and 72 include annular recesses 74 and 76, respectively, which are arranged to frictionally engage opposite peripheral edges of the flange portions of adjacent rim segments, as shown in Fig. 2. Each damper ring is thus entirely supported on and by reason of its frictional engagement with a plurality of the ring segment flanges 66, 67. When the wheel is rotated at high speed the flanges and damper ring tend to move radially outward by different amounts under the action of centrifugal force so that there will be a pressing action between each ring and the flanges entering the ring recess. When the blade vibrates the friction between the flanges and the ring will damp the vibration. The higher the speed of rotation the higher will be the magnification of the friction between the flanges and the damper ring. This is a desirable relation since the forces tending to incite vibration increase with the rate of rotation.

The rim segments 52 are arranged in series about the wheel, as described above, and the adjacent rim segments are interfitted to provide a rim means for the wheel. Each rim segment has a lapping element 80 fitting under the rim of the next adjacent rim segment, and attached to the rim segment carrying the lapping element, as shown at 82 in Fig. 6, but not to the adjacent rim segment under which the lapping element is interfitted. There is a small clearance between adjacent edges of rim segments 52, as clearly shown in Fig. 6, thus providing for vibration of each blade and its associated rim segment independently of adjacent blades and rim segments. This clearance will increase under running conditions, due to the centrifugal force and the elasticity of the materials.

Each rim segment is fixed to the blade preferably by solder at the surfaces of the opening 84. It is also connected or fixed to the disk 40 by the brackets 90, Fig. 2. Each bracket has the peripherally directed flange 92 soldered to the rim segment, and the side flanges 94 and 96 directed peripherally and soldered to the flanges 62 and 64 and to the opposite sides of the disk 40. There are two such brackets for each blade as shown in Fig. 3.

It will now be clear that the damper rings 70 and 72 will damp vibrations of the blades by friction acting on the flanges of the rim segments. Such dampers are preferably of ring or arcuate form.

While I have illustrated specific forms of the invention, it is to be understood that variations may be made therein and that I intend to claim my invention broadly as indicated by the appended claims.

I claim:

1. In combination a bladed wheel for exchanging force with a fluid, a hub structure including a wheel disk and a plurality of individual rim segments forming a rim means, said segments each having a flange extending therefrom in a generally axial direction forming a series of peripherally aligned flanges with only small clearances therebetween defining an exposed peripheral surface of substantial extent, a plurality of peripherally spaced blades each extending radially outward from said rim means, each said blade having a part extending radially inward through an adjacent said rim segment and connected thereto, means connecting each said blade with said disk at a locality spaced radially inward from the periphery of said rim means, each said blade with its respective said rim segment tending to vibrate and thus create forces having substantial components in a direction parallel to the periphery of said rim means, and a damper ring extending around said wheel interfitting and in frictional engagement with said peripheral surface of said flanges and entirely supported thereon to damp vibrations of said blades under the action of centrifugal force.

2. The combination as defined in claim 1 in which each rim segment has a lapping element fixed thereto and separate from but extending in lapping relation beneath the next adjacent segment.

3. In combination in a bladed wheel for exchanging force with a fluid, a hub structure including a wheel disk and a plurality of separate rim segments forming a rim means, a plurality of peripherally spaced blades each extending radially outward from said rim means, each said blade having a part extending radially inward through an adjacent said rim segment and connected thereto, means connecting each said blade with said disk at a locality spaced radially inward from the periphery of said rim means, each said blade with its respective said rim segment tending to vibrate and thus create forces having substantial components in a direction parallel to the periphery of said rim means, each said rim segment including a flange having an exposed edge directed axially of said wheel, and a damper ring spaced from said hub structure and frictionally engaging over said exposed edges of and entirely supported by said flanges to damp vibrations of said blades.

4. In combination in a bladed wheel for exchanging force with a fluid, a hub structure including a wheel disk and a plurality of separate rim segments forming a rim means, a plurality of peripherally spaced blades each extending radially outward from said rim means, each said blade having a part extending radially inward through an adjacent said rim segment and connected thereto, means connecting each said blade with said disk at a locality spaced radially inward from the periphery of said rim means, each said blade with its respective said rim segment tending to vibrate and thus create forces having substantial components in a direction parallel to the periphery of said rim means, each said rim segment including a flange directed axially of said wheel, a damper ring spaced from said hub structure and having a recess extending inward from one axial side thereof, and said ring receiving a plurality of said flanges within said recess in frictional engagement therewith to damp vibrations of said blades.

5. In combination in a bladed wheel for exchanging force with a fluid, a hub structure including a wheel disk, a plurality of blades spaced about the periphery of said disk and extending radially outward thereof, said blades being secured to said disk inwardly from the periphery thereof, a plurality of separate rim segments each carried by one of said blades at a position thereon spaced radially outward from said blade support, each said blade and its associated said rim segment being supported for vibration about a center radially inward from said rim segment and independently of adjacent said rim segments, said plurality of rim segments cooperating to define a rim means on said wheel and having friction developing portions with radially inner and outer surfaces, and a damper ring having a recess frictionally engaging said inner and outer surfaces of a plurality of adjacent said rim segments to damp vibrations of said blades by frictionally engaging adjacent said segments under the influence of centrifugal pressure developed during rotation of said wheel.

6. In a bladed wheel for force reaction with an elastic fluid the combination of a wheel disk and a hub ring fixed to said disk for mounting said disk for rotation about an axis extending transversely of said disk, a plurality of blades extending radially of said disk, means securing said blades to said disk in spaced relation to each other about the periphery of said disk, separate rim segments carried by said blades and cooperating to provide a rim means about said wheel spaced radially inward from the free ends of said blades, said rim segments having flanges radially inwardly of said rim means arranged in a series extending in the peripheral direction, said rim segments and the associated said blades tending to vibrate with components of the vibrational forces being directed peripherally of said wheel, and a damper ring having a recess received over and supported by frictional engagement with said rim segment flanges to damp the vibrations of said blades and the associated said rim segments.

7. In a bladed wheel for force reaction with an elastic fluid, the combination of a wheel disk and a hub ring supporting said disk for rotation about an axis extending transversely of said disk, a plurality of blades secured to and spaced about the periphery of said disk and extending radially outward thereof, a rim segment carried by each of said blades adjacent the end thereof nearest to said disk, said rim segments cooperating with each other to form a rim means on said wheel spaced radially inwardly from the free ends of said blades, said rim segments having flanges extending in a series outwardly from each side thereof in a generally axial direction, means securing said blades to said disk at points located radially inward of said wheel from said rim and defining a center of vibration for each said blade and its associated said rim segment, and damper rings on opposite sides of said wheel each having a recess frictionally engaging and supported on a series of said flanges independently of said wheel disk to damp vibrations of said blades and the associated said rim segments.

8. In a bladed wheel for force reaction with an elastic fluid the combination of a wheel disk and a hub ring for mounting said disk for rotation about an axis extending transversely of said disk, a plurality of blades extending radially of said disk, means for fixing said blades to said disk in spaced relation to each other about the periphery of said disk, individual rim segments carried by said blades and cooperating to provide a rim means about said wheel spaced radially inwardly from the free ends of said blades to define radially outward portions of said blades adapted to react with an elastic fluid, said rim segments and the associated said blades tending to vibrate with components of the vibrational forces being directed peripherally of said wheel during rotation thereof in force exchanging relation with the elastic fluid, each said rim segment including a flange, said flanges being aligned about said wheel in parallel relation with said rim means, a damper ring spaced from said wheel disk and having an annular recess therein, said ring being supported on the aligned said flanges of a plurality of said rim segments with portions of said flanges being received in frictionally engaging relation within said recess to damp vibrations of said blades and the associated said rim segments.

(References on following page)

References Cited in the file of this patent

UNITED STATES PATENTS

| | | |
|---|---|---|
| 1,544,318 | Hodgkinson | June 30, 1925 |
| 2,220,918 | Smith | Nov. 12, 1940 |
| 2,436,087 | Benson | Feb. 17, 1948 |
| 2,660,400 | Griffith | Nov. 24, 1953 |
| 2,836,392 | Spaeth | May 27, 1958 |

FOREIGN PATENTS

| | | |
|---|---|---|
| 206,362 | Great Britain | Nov. 8, 1923 |
| 240,283 | Switzerland | Apr. 1, 1946 |
| 393,333 | Germany | Jan. 6, 1921 |
| 595,643 | Great Britain | Dec. 11, 1947 |
| 623,525 | Great Britain | May 18, 1949 |
| 667,979 | Great Britain | Mar. 12, 1952 |
| 711,572 | Great Britain | July 7, 1954 |